(12) United States Patent
Delbos

(10) Patent No.: US 9,695,625 B2
(45) Date of Patent: Jul. 4, 2017

(54) DEVICE FOR EMERGENCY ACTUATION ESPECIALLY INTENDED FOR AN AIRCRAFT OPENING

(71) Applicant: RATIER FIGEAC, Figeac (FR)

(72) Inventor: Eric Delbos, Lacapelle-Marival (FR)

(73) Assignee: RATIER FIGEAC, Figeac (FR)

( * ) Notice: Subject to any disclaimer, the term of this patent is extended or adjusted under 35 U.S.C. 154(b) by 100 days.

(21) Appl. No.: 14/587,652

(22) Filed: Dec. 31, 2014

(65) Prior Publication Data

US 2016/0186479 A1 Jun. 30, 2016
US 2016/0305180 A9 Oct. 20, 2016

(30) Foreign Application Priority Data

Dec. 27, 2013 (FR) ...................... 13 63654

(51) Int. Cl.
E05F 15/72 (2015.01)
E05F 15/53 (2015.01)
B64C 1/14 (2006.01)

(52) U.S. Cl.
CPC ............ *E05F 15/72* (2015.01); *B64C 1/1423* (2013.01); *E05F 15/53* (2015.01)

(58) Field of Classification Search
CPC .......... F16K 13/06; F15B 15/19; E05F 15/72; B64C 1/1407; E05Y 2800/67;
(Continued)

(56) References Cited

U.S. PATENT DOCUMENTS 1,571,022 A * 1/1926 Obert ...................... F16K 17/16
137/71
2,960,096 A 11/1960 Summers
(Continued)

FOREIGN PATENT DOCUMENTS

CN 103075067 A 5/2013
CN 103375615 A 10/2013
(Continued)

OTHER PUBLICATIONS

FR, Search Report for 1363654, Dec. 27, 2013.
Chinese Office Action issued Feb. 28, 2017, in counterpart Chinese Patent Application No. 2014108585348.

*Primary Examiner* — Craig Schneider
*Assistant Examiner* — P. Macade Nichols
(74) *Attorney, Agent, or Firm* — Volpe and Koenig, P.C.

(57) ABSTRACT

This device comprises:
  a pneumatic cylinder (34),
  a gas generator (36),
  a chamber (6, 8) for atmospheric venting, with:
  an inlet with a connection to the gas generator (36),
  a first outlet,
  a second outlet,
  a valve (16) having a first side (24) and a second side (26) which can change position under the effect of a gas generated by the gas generator and comprising a passage (22) between the two sides (24, 26) obstructed by means which are clearable based on the pressure, where said shuttle-valve (16) is mobile between:
  a first position allowing connection to the first outlet and the second outlet and isolating the inlet from the first outlet and the second outlet; and
  a second position allowing connection of the inlet with the first outlet and isolating the second outlet from the inlet and the first outlet.

7 Claims, 5 Drawing Sheets

(58) Field of Classification Search
CPC ......... E05Y 2900/531; E05Y 2900/502; E05Y 2201/422; E05Y 2201/458
USPC ........................................ 137/62, 68.13, 71
See application file for complete search history.

(56) References Cited

U.S. PATENT DOCUMENTS

| | | |
|---|---|---|
| 8,998,141 B2 | 4/2015 | Bergonnier et al. |
| 9,228,668 B2 | 1/2016 | Simpson |
| 2002/0085928 A1 | 7/2002 | Chiba |
| 2013/0097930 A1* | 4/2013 | Bergonnier ........... B64C 1/1423 49/141 |

FOREIGN PATENT DOCUMENTS

| | | |
|---|---|---|
| DE | 7304958 | 7/1973 |
| EP | 1705383 | 9/2006 |
| FR | 2812681 | 2/2002 |
| WO | 2010067182 A1 | 6/2010 |

* cited by examiner

DEVICE FOR EMERGENCY ACTUATION ESPECIALLY INTENDED FOR AN AIRCRAFT OPENING

The present invention relates to a device for emergency actuation especially intended for an aircraft opening.

The present invention is implemented in the aeronautics domain and will be presented in combination with an emergency actuator for aircraft opening. It can however also have applications for other pneumatic actuators and also in other applications (e.g. other vehicles, industries, etc.).

An emergency actuator for aircraft opening causes a forced opening during an emergency phase without leading to interfere with the opening and closing of the opening during normal phases of utilization thereof. These actuators generally comprise the pneumatic cylinder with a piston and a chamber. The piston is connected to the opening via an opening mechanism whereas the chamber can be supplied with pressurized gas in case of emergency. The chamber of the cylinder is vented to atmosphere during normal operation the door so as not to disturb the operation thereof and is connected with a source of pressurized gas in case of emergency. Several types of opening actuators can be used like for example opening actuators using a pyrotechnic gas generator.

After actuation of the emergency opening device following a manual action such as, for example, using a percussion device, the gas generator provides in a very short time a pressurized gas causing the opening of the opening without any other outside intervention. In some cases (system or door blockage), the quantity of gas delivered is too much, the pressure increases and can cause significant damage to the actuation device and sometimes even the door.

The purpose of the present invention is then to provide an emergency actuation device with overpressure protection.

For this purpose, the present invention proposes a device for emergency actuation intended especially for an aircraft door comprising a pneumatic cylinder.

According to the present invention, the actuation device comprises a pyrotechnic gas generator and a device for atmospheric venting housing a chamber for atmospheric venting, with:
  an inlet with a connection to the pyrotechnic gas generator,
  a first outlet with a connection to a chamber of the pneumatic cylinder,
  a second outlet with a connection to the outside,
  a shuttle-valve having a first side and a second side which can change
  position under the effect of a gas generated by the gas generator and providing a seal, at least partial, on the periphery thereof with a wall of the chamber for atmospheric venting, where said shuttle-valve is mobile between:
    a first position allowing, both, connection to the first outlet and the second outlet and, also, isolating the inlet from the first outlet and the second outlet; and
    a second position allowing, both, connection of the first inlet with the first outlet and, also, isolating the second outlet from the inlet and the first outlet; and
    the shuttle-valve comprises a passage between the first side and the second side combined with means closing the passage when the pressure difference between the first side and the second side is less than a preset value and clearing the passage when the pressure difference between the first side and the second side is greater than a preset value.

In a way that is original, the present invention thus proposes to incorporate means near the valve slider with which to protect the device against overpressure there within, so that the device can change from a "normal operation" state to an "emergency" operation state.

According to an embodiment of the present invention, the means closing the passage can be burstable means placed on the second side of the shuttle-valve.

Here, the risk of overpressure in the chamber is eliminated by the presence of burstable means obstructing the passage between the first side and the second side of the valve. In fact, in case of overpressure, these means break and connect the chamber of the device with the outside.

In an embodiment, the burstable means are placed for example on the second side of the shuttle-valve. They can then for example be disk shaped and/or held on this second side using a peripheral ribbon of solder.

According to another embodiment of the device for emergency actuation, the burstable means can be placed inside of the shuttle-valve between the first side and the second side of the shuttle-valve. Here again, the burstable means can be disk shaped and then here be sandwiched, possibly with seals, inside the structure of the valve.

According to another embodiment of the device for emergency actuation, the means closing the passage can be a prestressed ball blocking an orifice placed in the passage made in the shuttle-valve.

An advantageous embodiment provides that the blocking means are arranged in one end of the chamber for atmospheric venting thus making it possible to easily block one end thereof. These means of obstruction, which can, for example be in the form of a stopper, can comprise a network of channels coupled to the second outlet allowing a circulation to the outside atmosphere of the fluid located in the chamber for atmospheric venting.

The present invention also relates to a device for atmospheric venting having a chamber for atmospheric venting, with:
  an inlet intended to receive a pressurized gas,
  a first outlet,
  a second outlet,
  a shuttle-valve having a first side and a second side while providing a seal, at least partial, on the periphery thereof with a wall of the chamber for atmospheric venting, where said shuttle-valve is mobile between:
    a first position allowing, both, connection to the first outlet and the second outlet and, also, isolating the inlet from the first outlet and the second outlet; and
    a second position allowing, both, connection of the first inlet with the first outlet and, also, isolating the second outlet from the inlet and the first outlet; and
    the shuttle-valve comprises a passage between the first side and the second side combined with means closing the passage when the pressure difference between the first side and the second side is less than a preset value and clearing the passage when the pressure difference between the first side and the second side is greater than a preset value.

Thus, when the pressure difference between the two sides of the valve becomes too large, the ball moves to release the passage of the gas, in the same way as a pressure relief valve.

In what follows, different embodiments of a device for actuating an aircraft opening according to the present invention are presented with reference to the attached schematic drawing in which.

The description which follows relates to a device for actuation intended to open an aircraft door in an emergency. Such a device comprises especially a device 1 for atmospheric venting with a valve 2, a valve body 4, a shuttle-valve and means of blocking.

Figure 3:
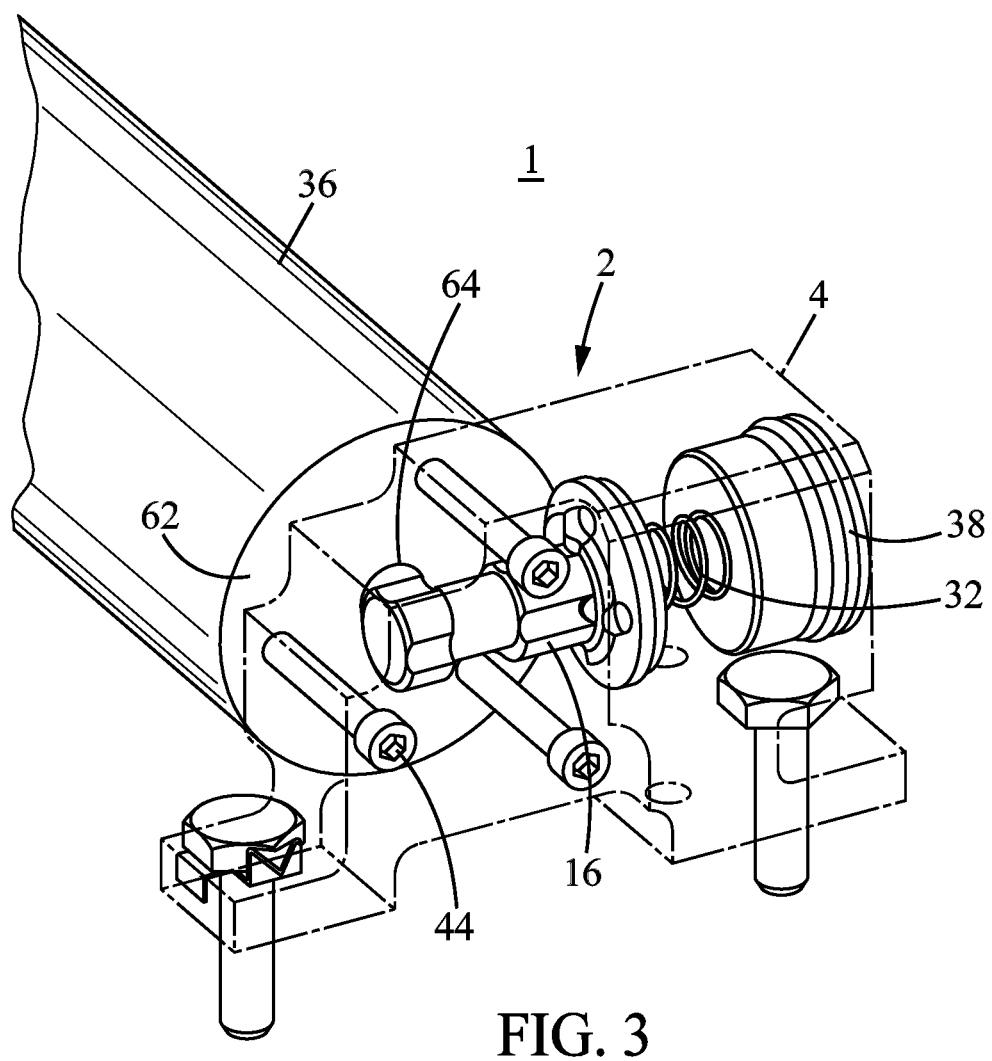
FIG. 3 is a perspective view of a device for emergency actuation according to the present invention.

The device 1 for atmospheric venting is here coupled with both a pneumatic device and also a means for generation of pressurized gas (FIG. 3). In the embodiment shown, the pneumatic device is the pneumatic cylinder 34 and means for generation of pressurized gas corresponding to a pyrotechnic generator 36, for example a dry material pyrotechnic generator. These devices will be described later.

The valve body 4 comprises a first cavity 6, a second cavity 8 connected to the first cavity 6 and thereby forming a chamber also called atmospheric venting chamber, a first orifice 10 opening into the first cavity 6, a second orifice 12 opening into the second cavity 8 and a third orifice 14 suited for connecting the second cavity 8 to the outside atmosphere. The second orifice 12 is arranged in an intermediate position between the first orifice 10 and the third orifice 14. The valve body 4 also comprises first means for attachment (for example screw 42 from FIG. 1) suited for attaching the valve body 4 to the pneumatic cylinder 34 and second means of attachment (for example screw 44 on FIG. 3) suited for attaching the pyrotechnic generator 36 to the valve body 4.

The means for plugging are arranged at one end of the second cavity 8 of the valve body 4. The means for plugging shown in the embodiment from the attached figures is made up by a stopper 38 made for example of synthetic material or metal. The stopper 38 is attached to one end of the second cavity 8 of the valve body 4, opposite the first cavity 6 by an embedded type connection. One or more O-ring type joints are positioned between the stopper 38 and the end of the second cavity 8 in order to assure sealing of the second cavity 8.

Figure 1:
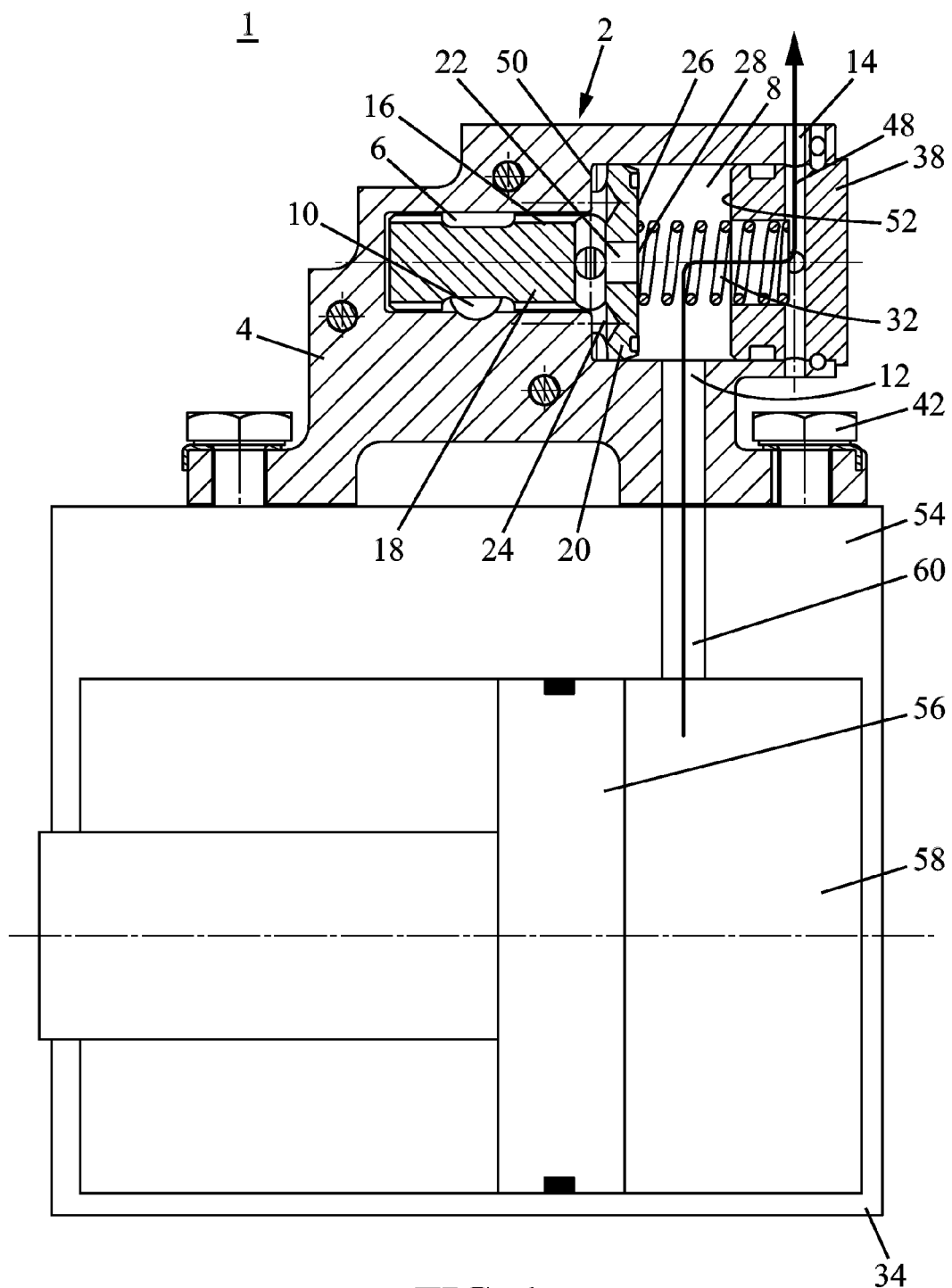
FIG. 1 is a schematic side view of a device for atmospheric venting according to the present invention.

As shown in FIG. 1, the stopper 38 comprises a circular shaped first part, having both, in its center, a blind hole whose diameter is suited for receiving restoring means formed here by spring 32 (for example coil) and also, on its periphery, a groove or throat suited for receiving a seal in order to satisfy the conditions for sealing with the inner wall of the second cavity 8.

The stopper 38 also comprises a second part of slightly larger diameter than that of the first part and thereby forming a shoulder used to block it against the valve body 4. Additionally, the stopper 38 comprises a network 48 of channels arranged parallel to the bottom of the stopper 38 and crossing it from one side to the other. The network 48 of channels is positioned connecting the third orifice 14 of the valve body 4 providing an atmospheric vent for the second cavity 8.

In another embodiment of the invention, several third orifices 14, and preferably four, are positioned 90° apart providing an optimization of the airflow.

The valve 2 shown in FIG. 1 is a slide-valve type valve. The slide for this valve 2 is implemented using a shuttle-valve that, in the figures, is a piston 16. This piston comprises a piston stem 18 and a piston head 20.

The shuttle-valve is positioned such that the piston stem 18 is slidably assembled into the first cavity 6 and the piston head 20 is slidably assembled into the second cavity 8. A sufficient seal is implemented for example by a calibrated play between the periphery of the piston head 20 and the inner surface of the second cavity 8 such that the piston head 20 divides the second cavity 8 into two sub-cavities (the first corresponding to a first side 24 and the other to a second side 26 of the piston head) isolated from each other. In contrast, longitudinal grooves are provided around the stem such that a pressure exerted on the stem 18 is also transmitted to the head 20 and then acts on the entire surface of the first side 24.

Thus, as will be presented later in the description, the piston stem 18 and the piston head 20 move respectively in the first cavity 6 and the second cavity 8 longitudinally to said cavities. A shoulder 50 between the first cavity 6 and the second cavity 8 serves as an end of range stop for one side of the piston head 20. The other end of range stop for the piston head 20 corresponds to the stopper 38.

The first side 24 of the piston head 20 also comes to rest on the shoulder 50 in a first end of range position and the second side 26 of the piston head 20 is in contact with the contact zone 52 on the stopper 38 when the piston 16 is in a second end of range position.

In the first position thereof (end of range), the piston 16, on the one hand, isolates the first cavity 6 from the second cavity 8 and, also, connects the second orifice 12 to the third orifice 14 by the second cavity 8. In the second position thereof (end of range), the piston 16 connects, both, the first orifice 10 the second orifice 12 via the first cavity 6 and the second cavity 8 and, also, isolates the first cavity 6 and the second cavity 8 from outside atmospheric pressure to a seal 80 on the surface 52.

The spring 32 is used to prestress the piston 16 in its first position (end of course). To do this, the spring 32 comes to rest, both, on the second side 26 of the valve head 20 and, also, on the stopper 38.

The device described previously is intended to be used in combination with a pneumatic cylinder 34 for actuating an opening. This cylinder comprises a cylinder body 54, a piston 56, a chamber 58 and a fourth orifice 60. The piston 56 is connected to the opening (not shown) whereas the cylinder body 54 is connected to a fixed structural element, for example a frame (not shown) associated with the opening.

The piston 56 moves from a first position (at the right in FIG. 1) to a second position (on the left in FIG. 2) in the chamber 58 according to a set strategy. The first position of the pneumatic cylinder 34 corresponds to the opening in closed position and the second position at the pneumatic cylinder 34 corresponds to an open position of the opening. The pneumatic cylinder 34 with the cylinder body 54 thereof, piston 56 thereof and chamber 58 thereof are known to the person skilled in the art and will not be described in detail in the description.

The pyrotechnic generator 36 (FIG. 3) includes a reservoir 62 with a stock of dry pyrotechnic material, a gas outlet 64 under pressure which is coupled to the first orifice 10 of the valve body 4. A seal (not shown) is used to assure the sealing between the pyrotechnic generator 36 and the valve body 4.

In order to remedy the problems of overpressure in the device 1 for atmospheric venting, it is proposed, both, that the head 20 comprise a passage 22 serving to connect the first side 24 of the piston head 20 with the second side 26 of the piston head 20 and, also, that burstable means 28 are used in said passage 22. These burstable means 28 both block the passage 22 and also free the passage 22 through the valve 16 after bursting of said burstable means 28 upon occurrence of an overpressure on the first side 24 of the head 20 of the piston (the other side of the head 20 always seeing atmospheric pressure).

Figure 4:
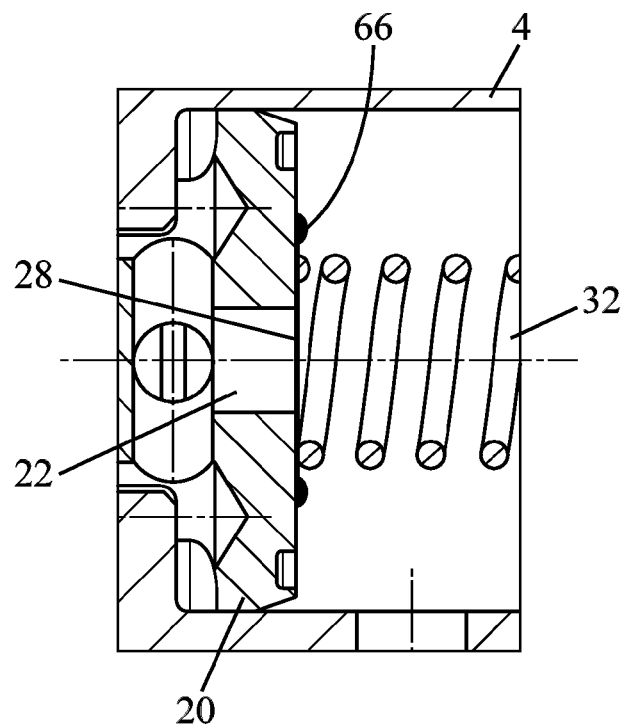
FIG. 4 is an enlarged view of a detail from FIG. 1.

The burstable means 28 comprise, in a first embodiment (FIG. 4), a disk, referred to as safety disk, whose diameter is greater than the diameter of the passage 22 and whose thickness is sufficient for withstanding a set overpressure. As shown in FIG. 4, the safety disk can be attached using a solder ribbon 66 which serves to provide an excellent seal and therefore prevent any passage of gas through the piston head 20 so long as the safety disk is intact.

The safety disk is preferably metal, but any other burstable or breakable material can be used. It is appropriate to use a fragile material, the least ductile possible, which therefore deforms little plastically and breaks when an overpressure applied on one of the surfaces thereof is too large.

In another embodiment (FIG. 5), the burstable means 28 are positioned between the first side 24 and the second side 26 of the piston head 20. The piston is made of two distinct parts: the piston stem 18 and the piston head 20. These parts are held by a thread 72 on the piston stem 18 and an internal thread 74 on the piston head 20 thus serving to attach the burstable means 28, which have here again advantageously in the shape of a disk, between the piston stem 18 and the piston head 20 by being positioned between the first side 24 and the second side 26.

Additionally, in order to provide the seal between the first side 24 and the second side 26, a seal 70 is positioned between the burstable means 28 and the first side 24. The seal 70 which in an embodiment is an O-ring has sufficient thickness to keep the burstable means 28 between the first side 24 and the second side 26 and thereby provide the desired seal between these two sides.

Figure 6:
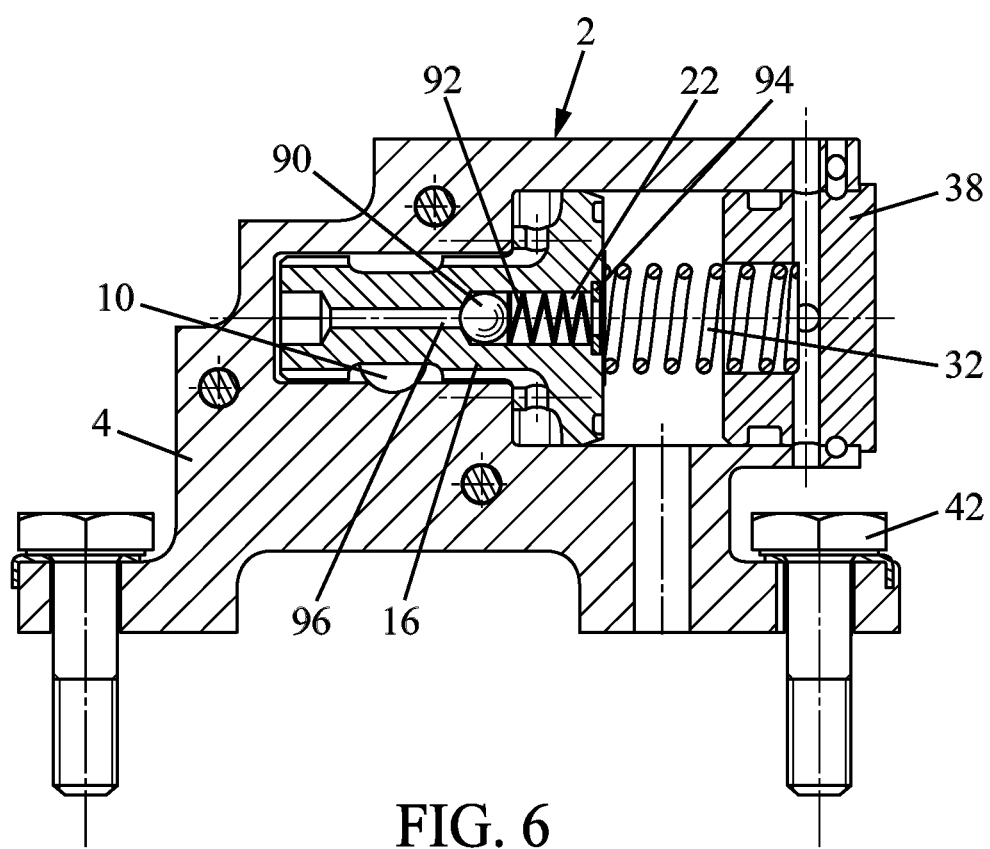
FIG. 6 is a side schematic view of a device for atmospheric venting according to another implementation variant.

In another example implementation (FIG. 6) for avoiding that an overpressure might occur in the device, elastic means 92 use a prestressed ball 90 as means of obstruction. On one side the elastic means 92 press against the prestressed ball 90 and on the other side press against a perforated disk 94. During the phase of overpressure between the two sides of the piston 16, the perforated disk 94 allows the gas to vent to the atmosphere through the second outlet 14.

The prestressed ball 90 is used for coming to block an orifice 96 (nozzle) arranged in the passage 22 made in the piston 16. Thus during an emergency opening phase of the opening, when the pressure difference between the two sides of the piston 16 becomes too much, the prestressed ball 90 frees the orifice 96 and thus clears the passage 22 allowing the circulation of gas through the perforated disk 94 to the atmosphere in the same way as a pressure relief valve.

In the following description, the operation of the emergency actuation device is described by considering three scenarios.

In the remainder of the description, a first scenario will represent the phases of opening and closing the aircraft opening in a "normal" mode, meaning that actuation of the safety device is not active. A second scenario will present the scenario of an actuation of the safety device showing an emergency phase during which the overpressure produced by the gas generation means inside the device 1 is not greater than the threshold value accepted by the means closing the passage 22 (burstable means 28 or prestressed ball 90). Finally, a third scenario will show an emergency phase with a sufficient overpressure to cause the clearing of the passage 22.

When the aircraft door is closed, the pneumatic cylinder 34 and also the piston 16 are both in their respective first positions as shown in FIG. 1. The first cavity 6 of the device 1 for atmospheric venting is partially isolated by a significant loss of load due to the small play between the head 20 and the body 4 in the chamber 58. Thus the first cavity 6 of the atmospheric venting device is connected to atmospheric pressure through the second orifice 12. Because of the device 1 for atmospheric venting the pressure in the chamber 58 of the pneumatic cylinder 34 is identical to atmospheric pressure and therefore does not interfere with the movement of the piston 56 and the chamber 58. During a door opening procedure, the piston 56 moves from the first position thereof to the second position thereof causing a change in the volume of the chamber 58 of the pneumatic cylinder 34. This change in the volume of chamber 58 does not lead to a change in the associated pressure because of the presence of the device 1 for atmospheric venting.

During an actuation of the emergency opening device, following a manual action, such as for example using a percussion device on the pyrotechnic generator, the generator provides pressurized gas in a very short time. The pressurized gas generated is directed through the outlet 64 of the pyrotechnic generator 36 and through the first orifice 10 of the valve body 4 into the first cavity 6.

The pressure in the first cavity 6 increases very quickly until it becomes such that the force exerted on the first side 24 of the piston head 20 and on the piston stem 18 is greater than the elastic force exerted on the second side 26 of the valve head 20 by the spring 32. Said force is exerted uniformly on the piston 16 which is placed in the first cavity 6. Thus, the second side 26 of the piston head 20 and the means which block the passage 22 through the piston 16 are subject to the same pressure.

The pressure increase is then going to cause the movement of the piston 16 from the first position thereof to the second position thereof. The second side 26 of the piston head 20 is kept in contact with the stopper 38 and the seal is assured by the seal 80 placed on the second side 26 as explained at the beginning of the description.

Figure 2:
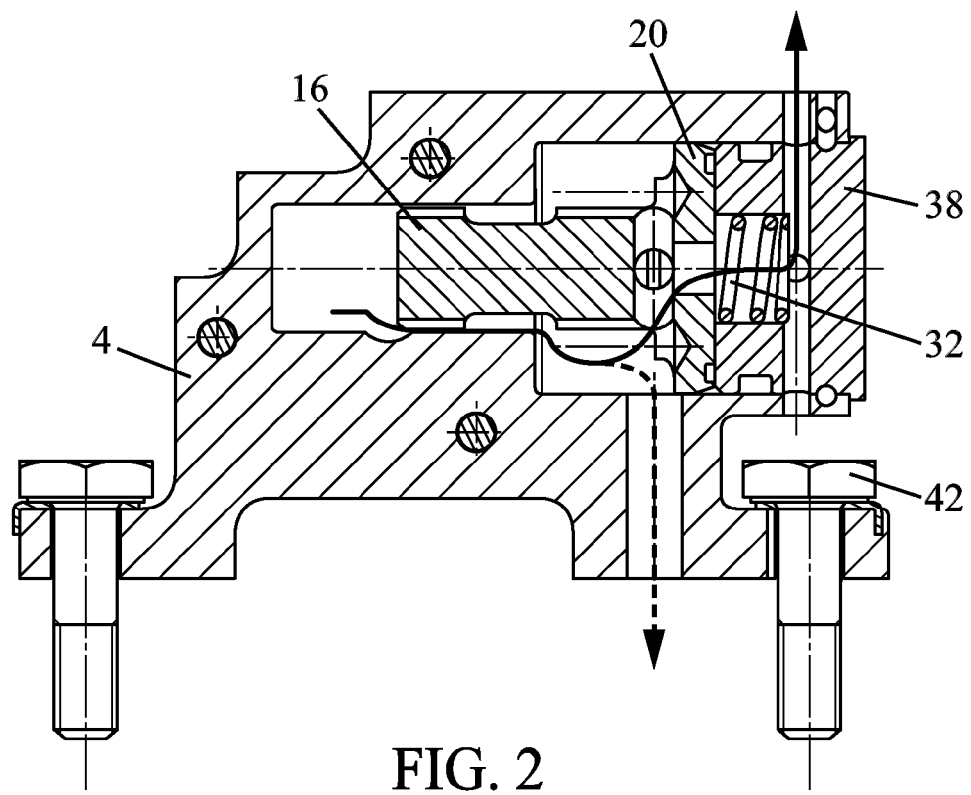
FIG. 2 is a schematic view corresponding to FIG. 1 but in a different position.

The gas stored in the first cavity 6 is then going to propagate through the second cavity 8 into the chamber 58 of the pneumatic cylinder 34, since the third orifice 12 is now connected with the pyrotechnic generator 36 because of the movement of the piston 16 (see pointed arrow from FIG. 2). The resulting pressure change in chamber 58 causes the movement of the piston 56 from the first position thereof to the second position thereof and causes an opening of the opening.

If during triggering of the emergency procedure the rising gas pressure is too great, corresponding to the pressure exerted on the first side 24 of the piston head 20, which is equally exerted on the means blocking the passage 22 through the piston head 20, then this pressure is going to cause, in the embodiments described above, either the bursting of the burstable means 28, or the opening of the orifice 96 closed by the prestressed ball 90. It is recalled here that one surface of the means obstructing the passage 22 is subject to the pressure caused by the pyrotechnic generator 36 but the other surface thereof is substantially at atmospheric pressure.

This pressure variation in the first cavity 6 is then going to first cause a movement of the piston 16 from the first position thereof to the second position thereof as described above. In contrast, when the pressure reached exceeds the threshold (which can be preset by the sizing of the burstable means 28 or by the prestress exerted on the ball closing the orifice 96), the pressure generated by this excessive gas discharge is going to cause the opening of the passage 22, allowing an atmospheric venting of cavities 6 and 8, and thereby preventing the pressure from increasing further (see arrow with solid line in FIG. 2).

Figure 5:
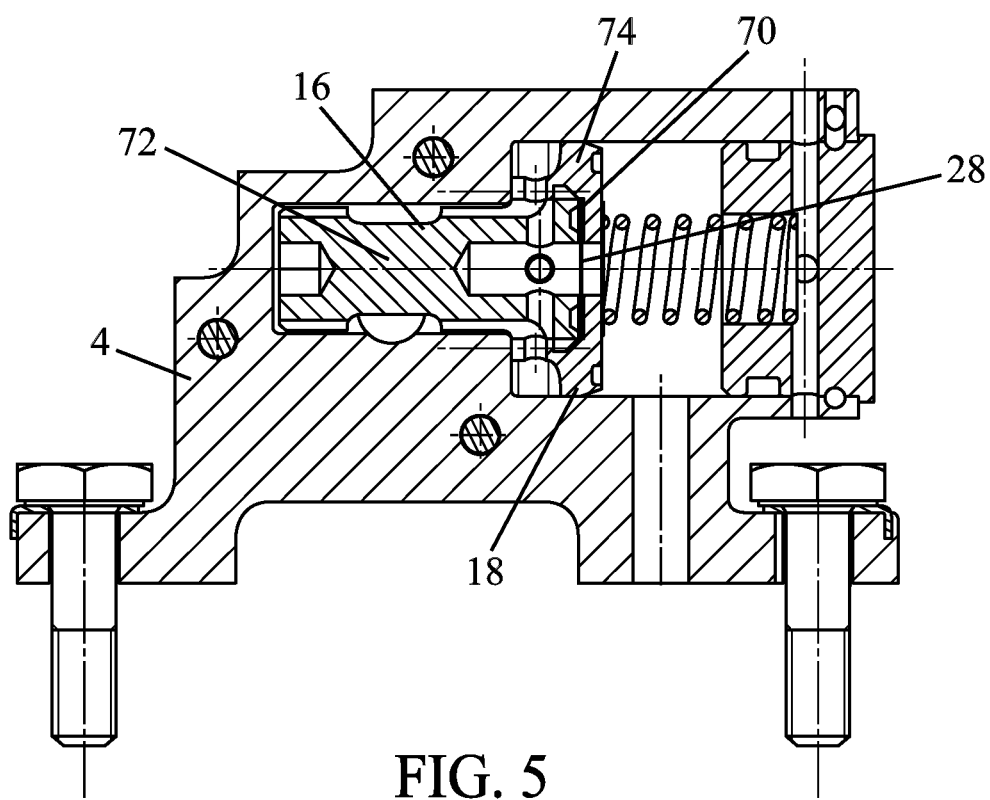
FIG. 5 is a view similar to FIG. 4 for an implementation variant of the present invention.

In the embodiments from FIGS. 4 and 5, once the burstable means 25 are damaged, the pressure becomes uniform on either side of the piston head 20 and the spring 32 returns the piston 16 into the first position thereof.

A device 1 for venting an actuator to atmosphere with a device for protection against overpressure using means closing a passage made in a shuttle-valve can therefore be implemented with the present invention. Thus, a device for venting to atmosphere is proposed intended especially for an emergency actuator for aircraft opening with a device for protection against overpressure without significantly increasing the production cost of such a product.

The present invention is not limited to the embodiments described above as nonlimiting examples and to the forms as shown on the drawing and to the other variants mentioned, but it involves all embodiments within the reach of the person skilled in the art in the framework of the following claims.

What is claimed is:

1. A device for emergency actuation especially intended for an aircraft opening comprising a pneumatic cylinder (34), wherein the device additionally comprises a pyrotechnic gas generator (36) and a device (1) for atmospheric venting housing a chamber (6, 8) for atmospheric venting, with:
   an inlet with a connection to the pyrotechnic gas generator (36),
   a first outlet with a connection to a chamber (58) of the pneumatic cylinder (34),
   a second outlet with a connection to an outside,
   a shuttle-valve (16) having a first side (24) and a second side (26) which can change position under the effect of a gas generated by the gas generator and providing a seal, at least partial, on the periphery thereof with a wall of the chamber (6, 8) for atmospheric venting, where said shuttle-valve (16) is mobile between:
   a first position allowing, both, connection to the first outlet and the second outlet and, also, isolating the inlet from the first outlet and the second outlet; and
   a second position allowing, both, connection of the first inlet with the first outlet and, also, isolating the second outlet from the inlet and the first outlet; and
   in that the shuttle-valve (16) comprises a passage (22) between the first side (24) and the second side (26) combined with means for closing the passage when the pressure difference between the first side (24) and the second side (26) is less than a preset value and clearing the passage when the pressure difference between the first side (24) and the second side (26) is greater than a preset value;
   wherein the means for closing the passage are burstable means placed on the second side of the shuttle-valve.

2. The device for emergency actuation according to claim 1, wherein the burstable means are placed between the first side (24) and the second side (26) of the shuttle-valve (16).

3. The device for emergency actuation according to claim 1 or 2, wherein the burstable means (28) have the shape of a disk.

4. The device for emergency actuation according to claim 1, wherein the means closing the passage (22) are a pre-stressed ball (90) blocking an orifice (96) placed in the passage (22) made in the shuttle-valve (16).

5. The device for emergency actuation according to claim 1 or, wherein the blocking means (38) are arranged in one end of the chamber (6, 8) for atmospheric venting.

6. The device for emergency actuation according to claim 5, wherein the means of obstruction (38) comprise a network of channels coupled to the second outlet (14).

7. A device (1) for atmospheric venting, wherein the device has a chamber (6, 8) for atmospheric venting, with:
   an inlet intended to receive a pressurized gas,
   a first outlet,
   a second outlet,
   a shuttle-valve (16) having a first side (24) and a second side (26) while providing a seal, at least partial, on the periphery thereof with a wall of the chamber (6, 8) for atmospheric venting, where said shuttle-valve (16) is mobile between:
   a first position allowing, both, connection to the first outlet and the second outlet and, also, isolating the inlet from the first outlet and the second outlet; and
   a second position allowing, both, connection of the first inlet with the first outlet and, also, isolating the second outlet from the inlet and the first outlet; and
   in that the shuttle-valve (16) comprises a passage (22) between the first side (24) and the second side (26) combined with means for closing the passage when the pressure difference between the first side (24) and the second side (26) is less than a preset value and clearing the passage when the pressure difference between the first side (24) and the second side (26) is greater than a preset value;
   wherein the means for closing the passage are burstable means placed on the second side of the shuttle-valve.

* * * * *